United States Patent [19]

Kawawaki

[11] Patent Number: 5,134,577
[45] Date of Patent: Jul. 28, 1992

[54] COMPUTER WITH ALGEBRAIC EXPRESSION MEMORY

[75] Inventor: Fumiaki Kawawaki, Yamatokoriyama, Japan

[73] Assignee: Sharp Kabushiki Kaisha, Osaka, Japan

[21] Appl. No.: 776,877

[22] Filed: Oct. 16, 1991

Related U.S. Application Data

[63] Continuation of Ser. No. 295,924, Dec. 29, 1988, abandoned.

[30] Foreign Application Priority Data

Dec. 29, 1987 [JP] Japan ............................ 62-332709

[51] Int. Cl.$^5$ ............................................ G06F 3/02
[52] U.S. Cl. ............................ 364/709.16; 364/709.15
[58] Field of Search ........................ 364/709.16, 797.15

[56] References Cited

U.S. PATENT DOCUMENTS

| | | |
|---|---|---|
| 4,028,538 | 6/1977 | Olander, Jr. et al. .......... 364/709.16 |
| 4,473,886 | 9/1984 | Rizk et al. ...................... 364/709.16 |
| 4,475,165 | 10/1984 | Rizk et al. ...................... 364/709.16 |
| 4,718,029 | 1/1988 | Morino et al. .................. 364/709.16 |

*Primary Examiner*—David H. Malzahn
*Attorney, Agent, or Firm*—Morrison & Foerster

[57] ABSTRACT

A computer having an algebraic expression reserve mode and a computation mode, and including an input key for commanding the execution of computations, the computer further including: a memory which stores an algebraic expression, if the input key is operated when the algebraic expression reserve mode has been set and the algebraic expression has not yet been stored; and a processor which conducts computations of an algebraic expression, if the input key is operated when the algebraic expression mode has been set and the algebraic expression has been stored.

2 Claims, 4 Drawing Sheets

| KEY OPERATION | DISPLAY |
|---|---|
| (1) [2ndF] [AER] | [1][:][-][ ][ ][ ][ ][ ][ ][ ]<br>0. [AER] |
| (2) [f()=] [ALPHA] A [f()=] | [1][:][f][(][A][)][=][ ][ ][ ][ ]<br>[AER] |
| (3) [SIN] [ALPHA] A [ENT/COMP] | [1][:][f][(][A][)][=][S][I][N][ ][A]<br>[AER] |
| (4) [ENT/COMP] | [A][=][?][ ][ ][ ][ ][ ][ ][ ] |
| (5) 30 [ENT/COMP] | [A][N][S][ ][1][=][ ][ ][ ][ ][ ]<br>0.5 |

FIG. 2

| | KEY OPERATION | DISPLAY |
|---|---|---|
| (1) | 2ndF AER | 1: □□□□□□□□<br>0. AER |
| (2) | f()= ALPHA A f()= | 1: f(A)=□□□□□<br>0. AER |
| (3) | SIN ALPHA A ENT | 1: f(A)=SIN□A<br>AER |
| (4) | 2ndF AER | □□□□□□□□□<br>0. |
| (5) | 2ndF 1: | A=?□□□□□□□<br>0. |
| (6) | 30 COMP | ANS□1=□□□□□<br>0.5 |

COMPUTER WITH ALGEBRAIC EXPRESSION MEMORY

This application is a continuation, of application Ser. No. 07/295,924, filed Dec. 29, 1988, now abandoned.

BACKGROUND OF THE INVENTION

1. Field of the Invention

This invention relates to a computer, more particularly, to a compact computer such as a pocket computer, and a scientific calculator in which one or more expressions can be stored.

2. Description of the Prior Art

A conventional compact computer such as a pocket computer and a scientific electronic calculator has a memory for storing one or more algebraic expressions or formulae to be computed. In such a computer, an expression is previously reserved in the memory, a value of the variable(s) of the expression is input, and thereafter the computation of the expression is executed. More specifically, the processes are executed in such a computer as follows:

(a) The algebraic expression reserve (AER) mode is set, and a specific memory region is selected;

(b) An expression is input to be stored in the selected memory region;

(c) The mode is shifted from the AER mode to the computation mode;

(d) The expression to be computed is accessed from the memory region;

(e) A value of the variable in the expression is entered; and (f) Computation of the designated formula is started by depressing the designated key.

When an expression to be computed has been already stored and the operation mode has been set to the computation mode, the computation of the expression is conducted following the above-mentioned processes (d) to (f), and thus, no problem is present in this case. Nevertheless, if the computation of a newly-stored expression is to be executed just after the expression to be computed has been stored (i.e., while the AER mode remains set), or if the computation of another previously-stored expression is to be executed while the AER mode still remains set, such a conventional computer has a problem as described below.

FIG. 5 illustrates a typical example of the key operation of a conventional scientific electronic calculator, for executing the computation of the expression sin A in which the numerical value (degree) stored in the A-memory is used as the variable of the expression. The way of the computation will be described by way of showing the process of the key operation.

(1) When a user depresses a second function [2ndF] key, and the algebraic expression reserve mode [AER]-key, the mode of the calculator is shifted to the AER mode. An indication "AER" appears in a display the contents of which are shown in the right column of FIG. 5. The first expression memory region is automatically selected, and "1:" is shown in the display.

(2) An expression [f()=] key, an alphabet [ALPHA] key, an [A] key, and the expression [f()=] key are operated to designate the A-memory as the variable.

(3) A [SIN] key, the [ALPHA] key, the [A] key, and an expression input [ENT] key are operated to store the expression sin A in the first expression memory region.

(4) The [2ndF] key and the [AER] key are operated. The mode of the calculator is shifted from the AER mode to the computation mode.

(5) The [2ndF] key and a [1:] key are operated to select the computation of the expression stored in the first expression memory region. A prompt informing that a number is to be input in the A-memory which is the variable of the expression is indicated in the display.

(6) Numeral keys [3] and [0] and a computation [COMP] key are operated to enter the numerical value "30" into the A-memory. Thereafter, the computation of sin 30° is conducted.

In such a conventional computer, the computation of a newly-stored expression just after the expression to be computed has been stored (i.e., while the AER mode remains set), or the computation of another previously-stored expression while the AER mode still remains set cannot be executed, until the mode is transferred from the AER mode to the computation mode and the expression to be computed is selected. As a result, a variety of keys should be operated before entering into the computation of an expression, thus causing much inconvenience to the user.

SUMMARY OF THE INVENTION

The computer of this invention, which overcomes the above-discussed and numerous other disadvantages and deficiencies of the prior art, comprises an input means for commending the execution of computations, said computer further comprises: a first means which stores an algebraic expression, if said input means is operated when the algebraic expression reserve mode has been set and the algebraic expression has not yet been stored; and a second means which conducts computations of an algebraic expression, if said input means is operated when the algebraic expression reserve mode has been set and the algebraic expression has been stored.

In a preferred embodiment, the computer further comprises a third means which conducts computations of another algebraic expression which had been stored, if said input means is operated after an algebraic expression has been stored.

Thus, the invention described herein makes possible the objectives of (1) providing a computer in which the computation of an expression stored in a memory can be executed without conducting the operation for shifting the mode from the AER mode to the computation mode; (2) providing a computer which is easy to operate; (3) providing a computer in which the number of key operations can be decreased; and (4) providing a computer in which the number of keys can be decreased.

BRIEF DESCRIPTION OF THE DRAWINGS

FIG. 2 is a diagram showing an example of the operation of essential keys of the calculator of FIG. 1.

DESCRIPTION OF THE PREFERRED EMBODIMENTS

Figure 3:
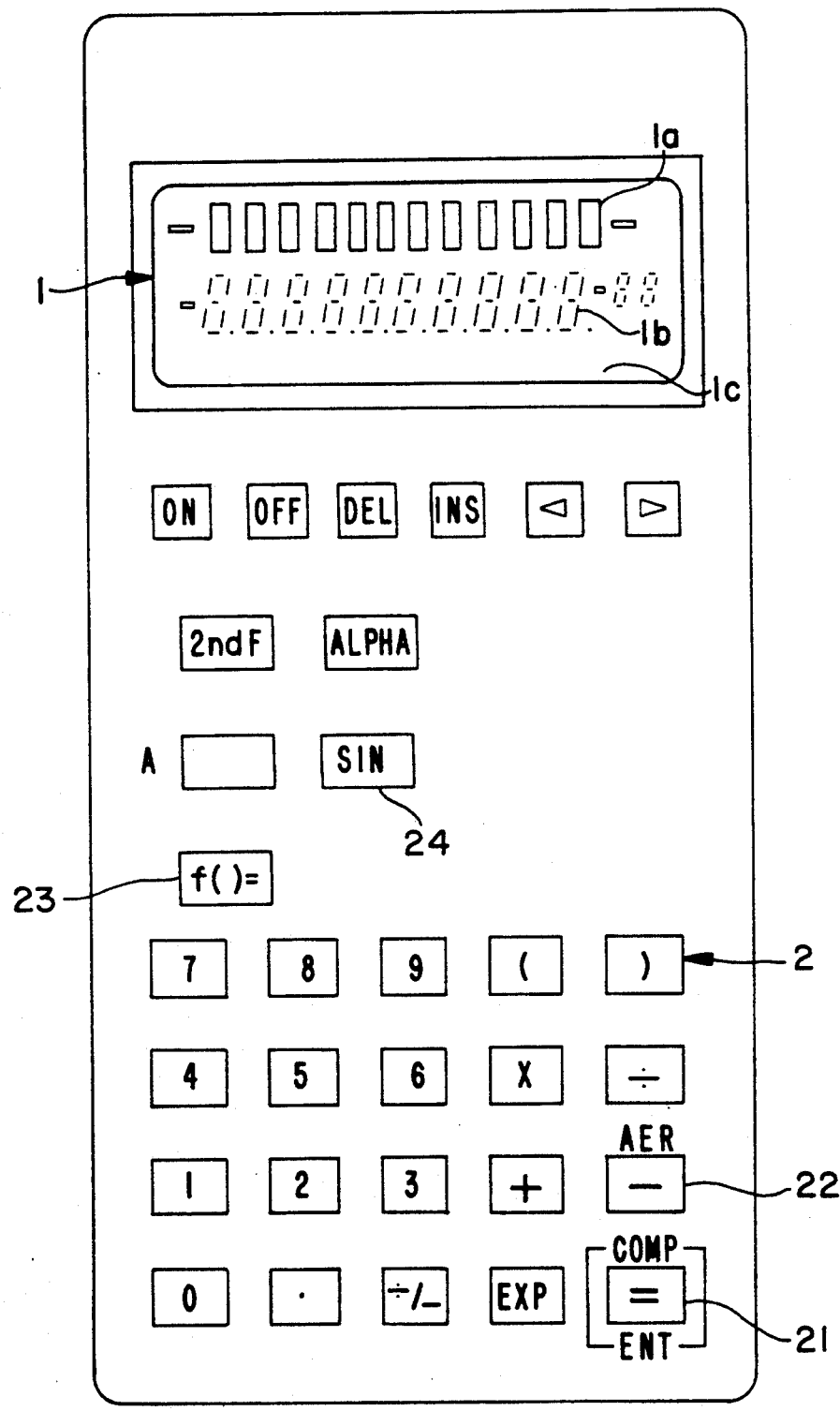
FIG. 3 is a front view of the calculator of FIG. 1.

FIG. 3 is a front view of a scientific electronic calculator according to the invention. To simplify the explanation, FIG. 3 diagrammatically illustrates only a liquid crystal display (LCD) 1 and those specific keys necessary for describing the operation of a key unit 2, and thus, those keys and designation of keys unnecessary for the explanation are deleted. The [ENT/COMP] key 21 shown in FIG. 3 has the functions of an equal [=] key used in conventional electronic calculators, a computation [COMP] key for commanding computations and an [ENT] key for storing an expression.

In this preferred embodiment, the LCD 1 comprises a first display region in which consists of 12-figure dot matrix for displaying one of the stored expressions, a second display region 1b which consists of 7 segments (including 10 figures of a mantissa and 2 figures of an exponent) for displaying a numerical value, and a third display region 1c which displays the current mode.

Figures 4, 5:
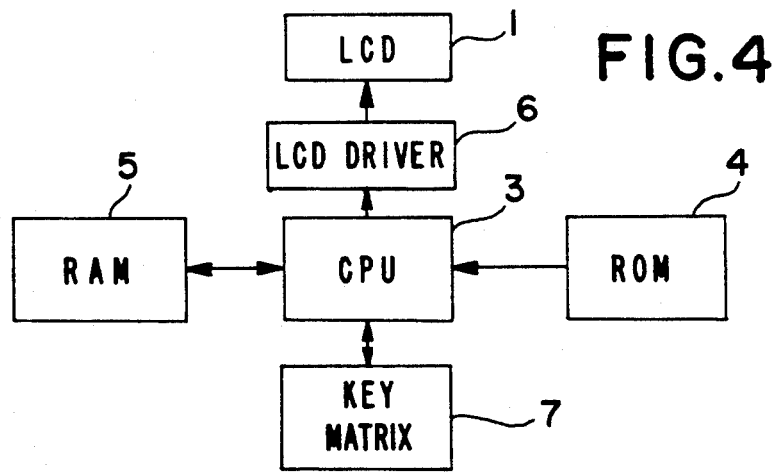
FIG. 4 is a block diagram of the calculator of FIG. 1.
FIG. 5 is a diagram illustrating an example of key operations of a conventional computer.

Referring to FIG. 4, the outline of this embodiment will be described. A CPU 3 controls the operations of the electronic calculator. A ROM 4 stores programs for the CPU 3. Like the one used in a conventional electronic calculator, the RAM 5 has memory regions necessary for controlling the electronic calculator and for storing expressions. An LCD driver 6 drives the LCD 1. A key matrix 7 detects signals input via the key unit 2.

Figure 1:
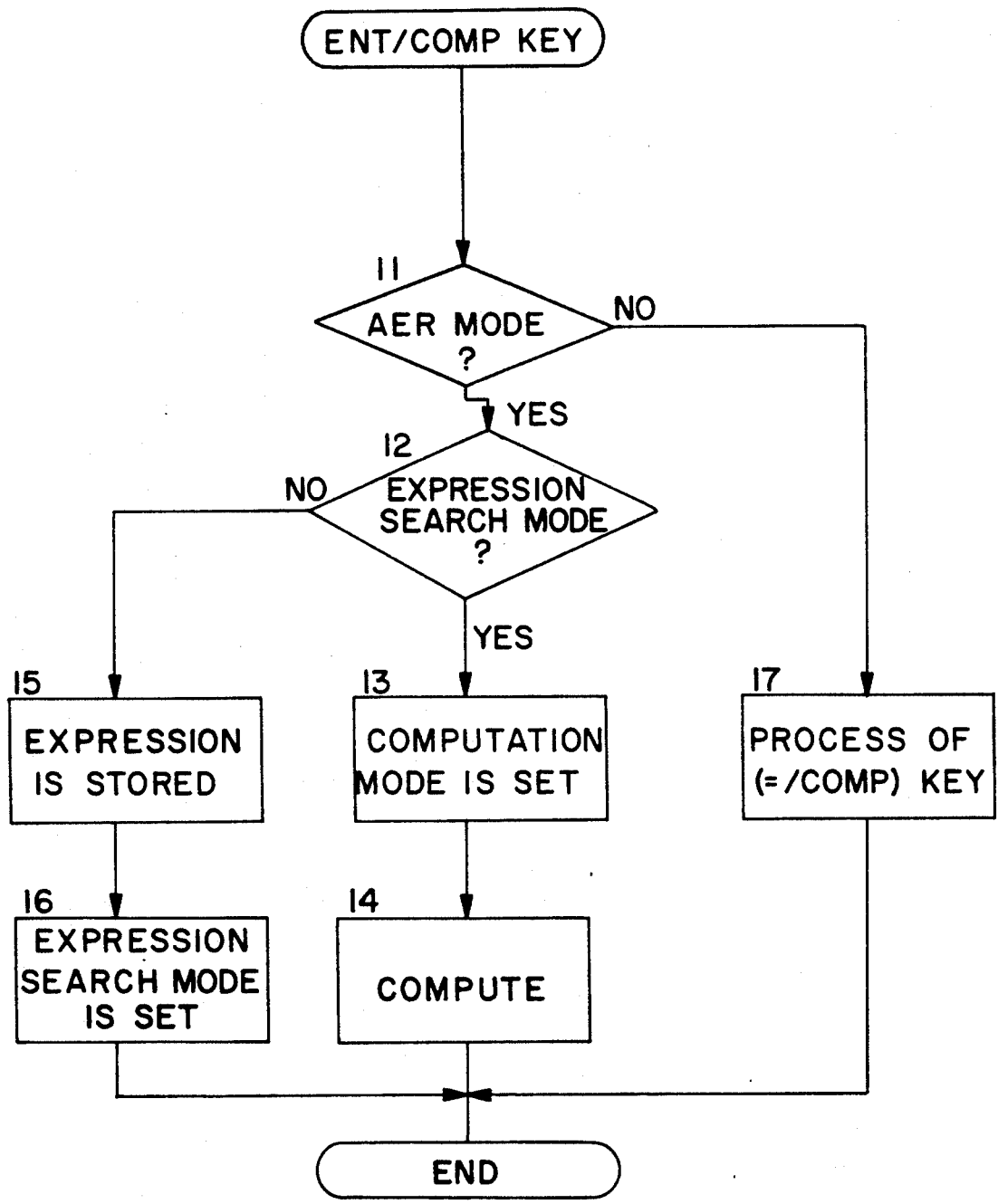
FIG. 1 is a flowchart of the sequential operations of a scientific calculator according to the invention.

FIG. 1 is a flowchart of the operation of the [ENT/COMP] key 21. When the [ENT/COMP] key 21 is depressed, step 11 starts so as to judge whether the AER mode is set or not. If the computation mode has been set, the operation proceeds to step 17 wherein operations identical to those performed with the depression of an [=/COMP] key in a conventional electronic calculator are executed. If the AER mode has been already set, the operation proceeds to step 12 wherein the CPU 3 judges whether the expression search mode, which will be described later, has been set, or not.

If the expression-search mode has not yet been set, an expression which has been input just before the depression of the [ENT/COMP] key 21 is stored in the predetermined memory region (step 15). After the completion of the storage of the expression, the operation proceeds to step 16. In step 16, the expression search mode is set. The expression search mode is the state where the AER mode has been set and the storage of an expression has been done.

When the [ENT/COMP] key 21 is depressed after the completion of the storage of an expression (i.e., the AER mode and the expression search mode have been set), the operation proceeds from step 12 to step 13 in which the AER mode is canceled and the computation mode is set. The expression which has been just stored is computed (step 14).

When executing the computation of another expression previously stored in another memory region, immediately after storing a certain expression in the memory, the following processes are sequentially executed. In step 15, a certain expression is stored in the memory. Then, the expression search mode is automatically set (step 16). Another expression to be computed is accessed. The [ENT/COMP] key 21 is depressed. The computation mode is set (step 13) to execute the computation of the other expression (step 14).

Referring to FIG. 2, the operation of the calculator of this embodiment will be described in the case wherein the expression sin A is computed immediately after this expression has been stored. The upper, middle and lower portions of the right column in FIG. 2 indicate the contents of the first to third display regions 1a to 1c, respectively.

(1) After the computation mode has been set, the second function [2ndF] key and the AER key 22 are depressed so that the AER mode is set. In the third display region 1c, the indication "AER" is displayed in the third display region 1c. The first expression memory region is automatically selected, and "1:" is displayed in the first display region 1a.

(2) The expression [f( )=] key 23, the alphabet [ALPHA] key, the [A] key and the expression [f( )=9 key 23 are sequentially depressed to designate the A-memory as the variable.

(3) The [SIN] key 24, the alphabet [ALPHA] key, the [A] key and the [ENT/COMP] key 21 are depressed, thereby the expression sin A is entered into the first expression memory region and the expression search mode is set. The cursor disappears from the first display region 1a.

(4) When the [ENT/COMP] key 21 is depressed again, the operation mode is automatically shifted from the AER mode in which the expression sin A is stored in the first memory region, to the computation mode in which the expression sin A stored in the first memory region is computed. The first display region 1a displays the prompt indicating that a numerical value is to be entered into the A-memory, which stores the variable A of the expression sin A to be computed (5) The [3] key, the [0] key and the [ENT/COMP] key 21 are depressed so that the numerical value "30" is entered into the A-memory. The computation of sin 30° is executed, and the obtained value "0.5" is displayed in the second display region 1b.

As described above, when the storage of an expression has been completed, the operation mode can be automatically shifted, independent of the AER mode being entered, from the AER mode to the mode for computing this expression, only by operating the key for commanding the execution of computations. When an expression is to be computed immediately after the storage of the expression or another expression, therefore, a user does not need to repeatedly operate a variety of keys for shifting the opeartion mode or selecting an expression to be computed, but he can simply operate a small number of keys to execute the computation of the selected expression. Furthermore, the key for commanding the computations functions also as the key for commanding the execution of the AER modes. This simple operation can effectively prevent a user from incorrectly operating the keys, and can decrease the number of keys so that keys can be arranged reasonably even when the key unit 2 has a narrow space.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A computer having an algebraic expression reserve mode and a computation mode, and comprising an input means for storing expressions and instructing the execution of computations, and a memory means for storing at least one algebraic expression, said input means further comprising:

a first means for storing an input algebraic expression in said memory means, if said input means is operated when the algebraic expression reserve mode has been set and said input algebraic expression has not been stored in said memory means; and a second means for conducting computations of an algebraic expression stored in said memory means, if said input means is operated when the algebraic expression reserve mode has been set and the input algebraic expression has been stored in said memory means, wherein said first means is a depressible key on the computer, and said second means is also said key.

2. A computer according to claim 1, wherein said said second means is also for conducting computations of another algebraic expression which has been stored in said memory means, if said input means is operated when the algebraic expression reserve mode is not set.

* * * * *

UNITED STATES PATENT AND TRADEMARK OFFICE
CERTIFICATE OF CORRECTION

PATENT NO. : 5,134,577
DATED : 28 July 1992
INVENTOR(S) : Fumiaki Kawawaki It is certified that error appears in the above-identified patent and that said Letters Patent is hereby corrected as shown below:

In column 1, lines 63 and 64
Please change "[f =]" to --[f( )=]--.

In column 3, line 10
Please insert "1a" after "first display region".

Signed and Sealed this

Twenty-sixth Day of October, 1993

BRUCE LEHMAN

Attest:

Attesting Officer

Commissioner of Patents and Trademarks